United States Patent
Guimbretiere

[11] Patent Number: 5,782,696
[45] Date of Patent: Jul. 21, 1998

[54] FIXED BALL-TYPE HOMOKINETIC JOINT

[75] Inventor: Pierre L. Guimbretiere, Neauphle le Chateau, France

[73] Assignee: GKN Automotive, Germany

[21] Appl. No.: 805,586

[22] Filed: Feb. 25, 1997

[30] Foreign Application Priority Data

Mar. 4, 1996 [FR] France ................ 96 02692

[51] Int. Cl.[6] .................................................. F16D 3/224
[52] U.S. Cl. ................................................ 464/145; 464/906
[58] Field of Search ............................ 464/143, 145, 464/906

[56] References Cited

U.S. PATENT DOCUMENTS

| | | | |
|---|---|---|---|
| 4,331,005 | 5/1982 | Hirai et al. | 464/145 |
| 4,589,857 | 5/1986 | Okoshi | 464/145 |
| 4,610,643 | 9/1986 | Krude | 464/143 |
| 4,820,240 | 4/1989 | Girguis | 464/145 |
| 4,861,316 | 8/1989 | Welschof | 464/145 |
| 4,915,672 | 4/1990 | Girguis | 464/145 |
| 5,122,096 | 6/1992 | Aucktor et al. | 464/145 |
| 5,288,273 | 2/1994 | Krude | 464/145 |
| 5,542,885 | 8/1996 | Krude et al. | 464/906 |

FOREIGN PATENT DOCUMENTS

| | | |
|---|---|---|
| 2655103 | 5/1991 | France. |
| 0241521 | 5/1984 | Japan. |

Primary Examiner—Eileen A. Dunn
Attorney, Agent, or Firm—Howard & Howard

[57] ABSTRACT

In a ball-type joint, the directrix lines (16B) of the grooves (12) of the hub element (3) are defined in such a manner as to provide a groove depth which only slightly varies. The directrix lines (14B) of the grooves (9) of the bell elements are deduced by symmetry relative to a bisecting plane (P) of the joint.

13 Claims, 4 Drawing Sheets

1

FIXED BALL-TYPE HOMOKINETIC JOINT

BACKGROUND OF THE INVENTION

The present invention relates to a fixed ball-type homokinetic joint of the type comprising;
- a bell element adapted to be connected to a first shaft, the cavity of said bell element being at least partly spherical and comprising six first grooves, the directrix line of each first groove being contained in an axial plane of the bell element;
- a hub element adapted to be connected to a second shaft, the outer surface of said hub element being at least partly spherical and provided with six second grooves, the directrix line of each second groove being contained in an axial plane of the inner joint element;
- six balls received respectively partly in pairs of said first and second grooves, and
- a cage retaining the balls in the bisecting plane of the joint when the joint is flexed, said cage comprising spherical outer and inner surfaces respectively substantially conjugate to the spherical surface of the bell element and the spherical surface of the hub element, the directrix lines of said first and second grooves being constantly symmetric relative to the bisecting plane and each comprising, for said first grooves, a first arc whose center of curvature is offset toward the entrance of the bell element relative to the center of the joint, and, for said second grooves, a second arc whose center of curvature is offset toward the inner end of the bell element relative to the center of the joint.

In this type of joint, the most representative is the joint named "Rzeppa", in which the grooves formed in the two main parts, namely the bell element and the hub element, and adapted to receive the balls, have directrix lines which are arcs of a circumference throughout their length so as to be capable of operating at a small, and even zero, joint flexing angle, the arcs of a circumference having different centers positioned on the axis of the two main parts and symmetrically offset, for the bell element and the hub element, relative to the center of the joint. This results in a permanent crossing of the directrix lines and consequently in the existence of an angle which pilots the position of the balls and therefore of the cage.

Another known joint of the aforementioned type sold by the group GKN under the name "UF", differs from the preceding joint in that one portion of the arcs of a circumference is replaced by another curve, in principle a straight line parallel to the axis of the part. This permits forming the grooves of the two main parts with modern manufacturing means such as extrusion instead of machining. In the basic UF type, the cage remains spherically and materially retained by the bell element. On the other hand, in the "UF" joint, the cage is no longer retained by the bell element whose entrance is cylindrical; it is therefore necessary to add additional means for retaining the cage, the simplest of which comprises six blocks placed and welded in the bell element.

All these ball-type joints have the following drawbacks:
- the balls have a large radial displacement, of the order of the thickness of the cage, when the joint rotates with a large flexing angle. Consequently, the balls come to bear against the edges of their guiding openings in the cage at the maximum flexing angle;
- the grooves have depths which are very evolutive along their length, whence serious risks of local fractures when the balls are positioned in the shallow places.

This is all the more regrettable since it is in these situations, which correspond to the maximum flexing angles, that the forces exerted on the balls are the greatest;
- the grooves of the hub element steeply "plunge" toward the axis of the hub element adjacent to the shaft carrying the hub element, which considerably limits the diametral dimension of the splines it is possible to form in the central bore of the hub element;
- the crossing of the directrix lines of the grooves of the two main parts, required for very small joint flexing angles, to form the aforementioned piloting angle, remains large for large flexing angles. This introduces a greatly oversized definition of the bisecting plane, by the six balls, under the last-mentioned conditions, with for consequence a reduced efficiency of the joint.

SUMMARY OF THE INVENTION

An object of the invention is to avoid, or at least greatly reduce, the aforementioned drawbacks.

The invention therefore provides a homokinetic joint of the aforementioned type, characterized in that;
- in considering, for each second groove, (i) a first predetermined point of the directrix line spaced from the diametral plane of the hub element perpendicular to the axis of the hub element, toward the entrance of the bell element, or contained in said plane, (ii) the tangent, at said point, to the circle centered on the corresponding center of curvature of said directrix line, and (iii) a reference point positioned radially outside the point of said circle which is positioned in the bisecting plane of the joint when the joint is flexed at a maximum angle, then:
- the directrix line is a curve which is tangent to said tangent at said first point and passes through said reference point.

The homokinetic joint according to the invention may comprise one or more of the following features:
- said curve extends within the limits of the hub element, on each side of a plane parallel to said diametral plane and containing the point of the directrix line the most remote from the axis of the hub element;
- said reference point is so chosen as to define at the adjacent end of the hub element, a groove depth substantially equal to the groove depth in said diametral plane of the hub element;
- said curve comprises an arc of a circle which extends on each side of said diametral plane and is extended toward the entrance of the bell element by a curve segment positioned between said circle and a line parallel to the axis of the hub element which passes through the closest end of the arc of a circle;
- starting at said diametral plane, said arc of a circle extends on a portion whose subtended angle at the center permits having constantly a minimum of four balls in the portions of the grooves corresponding to said arcs of a circle when the joint operates at its maximum flexing angle;
- said portion of said arc of a circle subtends an angle at the center of the order of 5°;
- said curve segment is the tangent to said arc of a circle at said first point;
- the center of said arc of a circle is positioned beyond the axis of the hub element relative to said first point;
- said curve comprises an arc of a conic tangent at said first point to said tangent, said arc passing through said reference point;

said conic has an axis of symmetry perpendicular to the axis of the hub element;

said conic is a hyperbola;

said curve is extended toward the inner end of the bell element beyond a point where the tangent to said curve is parallel to the axis of the hub element, within the limits of the hub element, by an arc of a circle centered on the center of curvature corresponding to said point;

said curve is extended by said tangent toward the inner end of the bell element beyond a point where the tangent to said curve is parallel to the axis of the hub element, within the limits of the hub element.

BRIEF DESCRIPTION OF THE DRAWINGS

Embodiments of the invention will now be described with reference to the accompanying drawings in which.

DETAILED DESCRIPTION OF THE DRAWINGS

Figure 1:
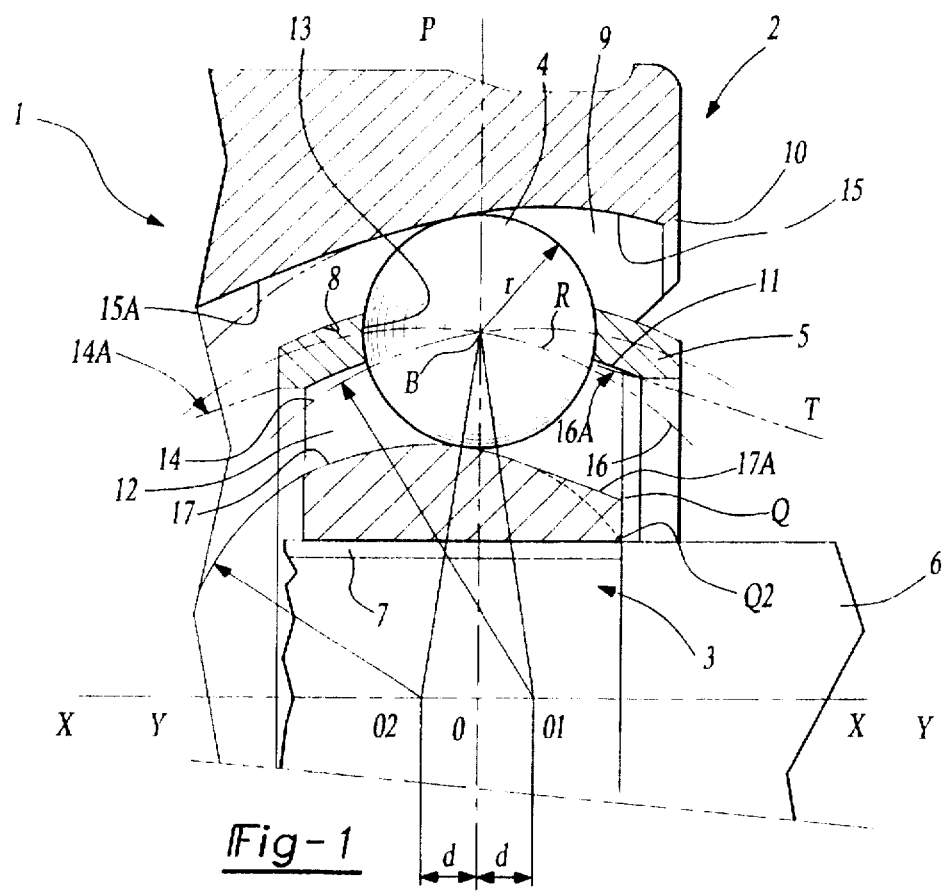
FIG. 1 is a half meridian sectional view, in the aligned position of the two main joint parts, of a homokinetic joint according to the invention.
Figure 2:
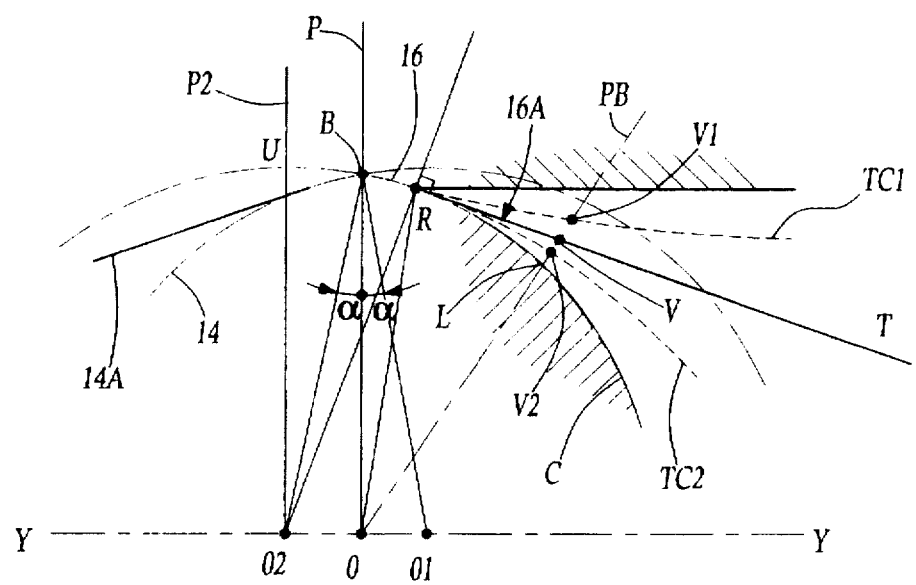
FIG. 2 is a simplified diagram of the same joint.

The homokinetic joint 1 partly shown in FIG. 1 and diagrammatically represented in FIG. 2 comprises two main parts, namely an outer bell element 2 and a hub element 3, six balls 4 and a cage 5 for retaining the balls in the bisecting plane of the joint. When the joint is assembled, the bell element 2 is connected to a first shaft (not shown) having an axis X—X, and the hub element 3 is connected to a second shaft 6 having an axis Y—Y. These two axes are coincident in FIGS. 1 and 2 where the joint parts are in alignment with each other.

Typically, the bell element is in one piece with the first shaft which is a stub axle of a driving wheel, and the hub element is fixed to the second shaft, which is a driving shaft, by axial splines 7 provided in its central opening.

The bell element 2 has a spherical cavity 8 with a center 0 which is open in the direction toward the shaft 6 and in which are provided six first grooves 9 which are angularly evenly spaced apart, each groove being contained in an axial plane of the bell element. Each groove extends on each side of the diametral plane P of the bell element perpendicular to the axis X—X and opens onto an entrance chamfer 10 on the bell element.

The hub element 3 has a spherical outer surface 11 of center 0 in which are provided six second grooves 12 which are angularly evenly spaced apart, each groove being contained in an axial plane of the hub element. These grooves 12 extend on each side of the diametral plane of the hub element which is coincident with the plane P when the joint parts are in alignment with each other, and they open onto the two end faces of the hub element which are parallel to said diametral plane.

The grooves 9 and 12 have circular cross sections of the same radius r.

The cage 5 comprises outer and inner spherical surfaces of center 0 which respectively cooperate with said surfaces 8 and 11. It further comprises six openings 13 in each of which a ball 4 is guided. Each ball has a radius substantially equal to r and cooperates with a respective pair of grooves 9, 12.

The joint 1 is derived from a "Rzeppa" joint in which the directrix lines and the bottom of the grooves are defined in the following manner.

For each groove 9, the directrix line 14 is, throughout its effective length, an arc of a circle whose center 01 is positioned on the axis X—X, at a distance d from the point 0 toward the entrance of the bell element. The groove bottom 15 is consequently the outer envelope of circles centered on this arc and has a radius r.

Likewise, for each groove 12, the directrix line 16 is, throughout the length of the hub element, an arc of a circle C whose center 02 is positioned on the axis Y—Y, at the same distance d from the point 0 toward the inner end of the bell element. The groove bottom 17 is consequently the inner envelope of circles centered on this arc and has a radius r.

The arcs of a circle 14 and 16 which are symmetric in pairs relative to the plane P are shown in dot-dash lines in FIGS. 1 and 2. They intersect at the center B of the ball and define the piloting angle O2BO1=2α of the joint, which is the angle made by the tangents to the two arcs at the point B.

The joint according to the invention differs from this "Rzeppa" joint in the following manner:

Considering the grooves 12, the arc of a circle 16 of center 02 stops at a point R adjacent to the entrance to the bell element. Then this arc of a circle is extended toward the entrance of the bell element by the tangent T to the same circle at R. The arc of a circle 16 and the tangent T form a curve 16A which intersects at maximum angularity the bisecting plane, designated by the reference PB, of the joint at a reference point V. This point V is of course in the plane PB outside the intersection L of the circle C and the plane PB.

The bottom 17A of each groove 12 is deduced from the curve 16A described above by tracing the inner envelope of circles of radius r centered on this curve.

The directrix line 14A and the bottom 15A of the grooves 9 of the bell element are symmetric, relative to the plane P, with the lines 16A and 17A described above so as to satisfy the homokinetic property of the joint.

It follows from the foregoing;

that the groove bottoms 17A adjacent to the entrance of the bell element intersect the end face of the hub element at a point Q which is situated distinctly radially outside the point Q2 corresponding to the "Rzeppa" joint. Consequently, the splines 7 may have a distinctly larger diametral dimension and the corresponding fragile region of the hub element is eliminated. Note that the grooves 12 have, in the region of the plane PB, a depth substantially equal to their depth in the plane P;

that the grooves 9 have, adjacent to the inner end of the bell element, an increased depth, which results in an improved contact between the balls and these grooves when the torque is applied.

In an alternative embodiment, the straight line segment T may be replaced by another segment of a curve TC1 or TC2 between the circle C which defines the arc 16 and the line parallel to the axis Y—Y which passes through the point R, i.e. between the two hatched regions of FIG. 2. The segment TC1, TC2 may be concave or convex, as illustrated in FIG. 2, and is tangent to the straight line T at the point R. Related points VI and VII and L relating to these segments can be seen FIG. 2. Further, preferably, for reasons of convenience of manufacture, the curve does not have a neck relative to the axis Y—Y, i.e. a point positioned at a minimum distance from this axis.

Figure 3A:
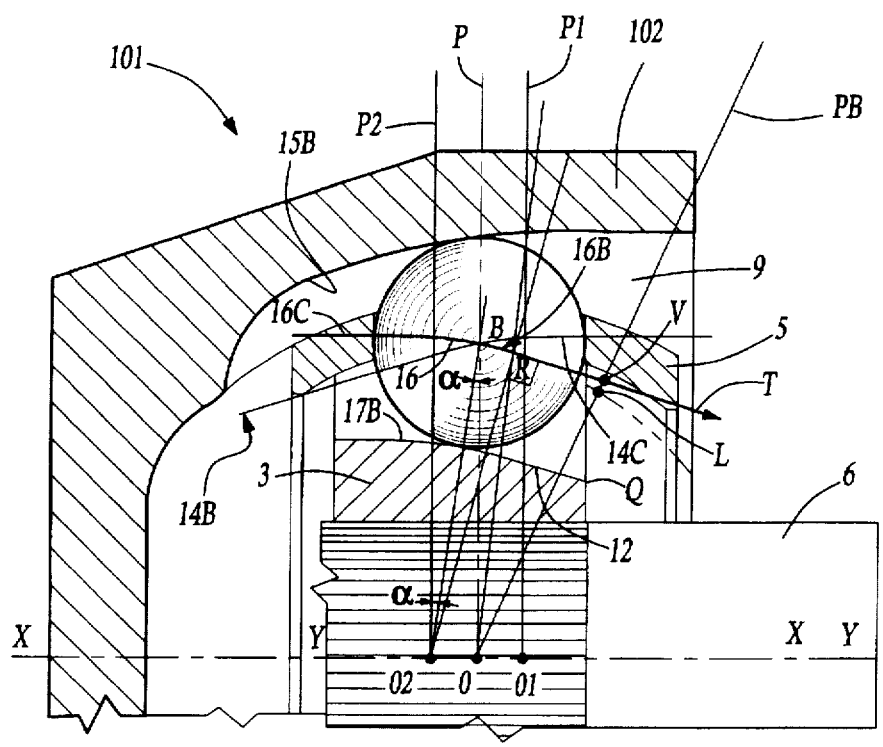
FIG. 3A and 3B are meridian sectional views, in the aligned position of the joint parts, of two other embodiments of the homokinetic joint; according to the invention.

The homokinetic joint 101 shown FIG. 3A is a joint according to the invention derived from the "UF" joint mentioned above. It differs from the modified "Rzeppa" joint of FIGS. 1 and 2 only in the following respect: in the direction toward the entrance of the bell element 102 and beyond the plane P1 perpendicular to the axis X—X and passing through the point 01, the directrix line 14B of the grooves 9 of the bell element becomes a segment of a straight line 14C parallel to the axis X—X. By symmetry, in the direction toward the inner end of the bell element and beyond the plane P2 perpendicular to the axis Y—Y and passing through 02, the directrix line 16B of the grooves 12 of the hub element becomes a segment of a straight line 16C parallel to the axis Y—Y. The groove bottoms 15B, 17B are modified correspondingly.

Figure 3B:
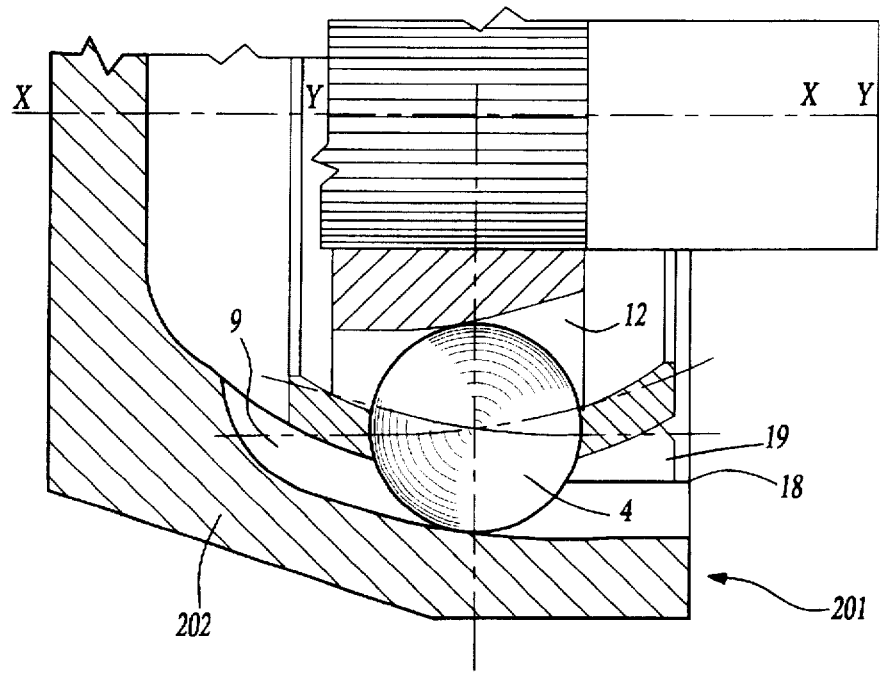

The joint 201 shown in FIG. 3B is a joint according to the invention derived from the "UFi" joint mentioned above. It differs from the preceding joint only by the presence of a cylindrical entrance portion 18 up to the vicinity of the plane P of the cavity of the bell element 202. The cage is then maintained axially by a series of blocks 19 having a substantially triangular section disposed circumferentially between the grooves 9. This modification involves no change in the definition of the directrix lines and of the groove bottoms 9 and 12 which are identical to the curves 14B to 17B described above.

The advantages indicated above are exhibited in the joints 101 and 201, this time with respect to the UF and UFi joint from which they are derived.

Figure 4:
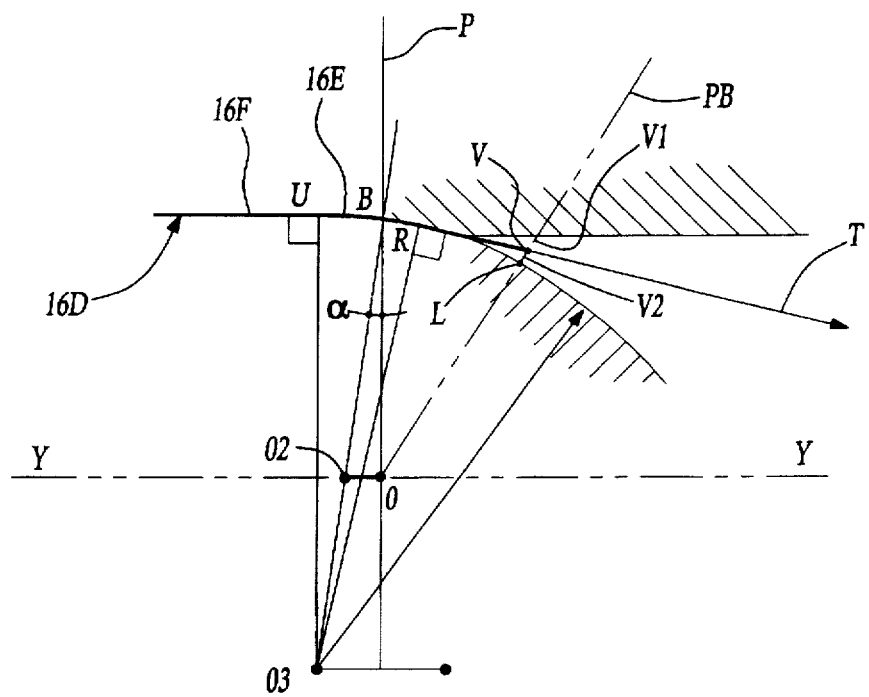
FIGS. 4 and 5 are simplified diagrams illustrating two other embodiments of the joint according to the invention.

The diagrammatic view of FIG. 4 defines another embodiment of the joint according to the invention. This view relates to a joint derived from a UF or UFi joint, but it will be understood that it may define in the same way a joint according to the invention derived from a "Rzeppa" joint.

In this FIG. 4, which shows only the directrix line 16D of a groove 12 of the hub element, the point B and the angle α of FIG. 2 are retained. The directrix line 16C comprises an arc of a circle 16E centered on a point 03 positioned on the straight line 02B beyond the axis Y—Y relative to the point B. The arc of a circle thus defined extends toward the inner end of the bell element to a point U so that 03U is parallel to the plane P, and is then extended tangentially by a segment of a straight line 16F parallel to the axis Y—Y. On the other side, the arc 16E passes through the plane P, extends to a point R and is then extended toward the entrance of the bell element by the tangent T to the same circle at point R.

As before, the tangent T may be replaced by another segment of a curve between the two hatched regions of FIG. 4.

Figure 5:
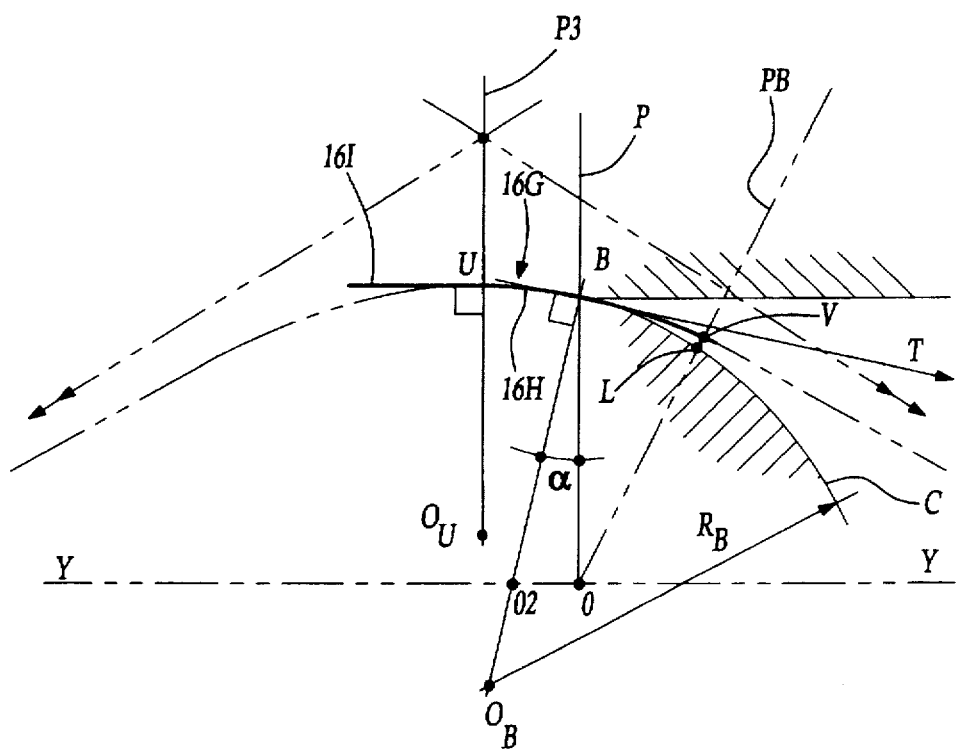

In the embodiment shown in FIG. 5, with the same elements U,B and α, the directrix line 16G comprises an arc 16H of a conic, i.e. of a second degree curve, whose axis of symmetry P3 is parallel to the plane P and passes through the point U, the tangent T at B making the angle a with the axis Y—Y and the arc furthermore passing through a reference point V defined above with reference to FIG. 2. In this example, it concerns a hyperbola. The arc 16H is extended tangentially toward the inner end of the bell element from the point U by a segment of a straight line 16I parallel to Y—Y.

In the case of FIG. 5, the portion of the hyperbolic arc BV may be replaced by another segment of a curve between the two hatched regions defined by the circle C and the line parallel to Y—Y which passes through the point B, this segment being, as before, tangent to the circle C at B.

Figure 6:
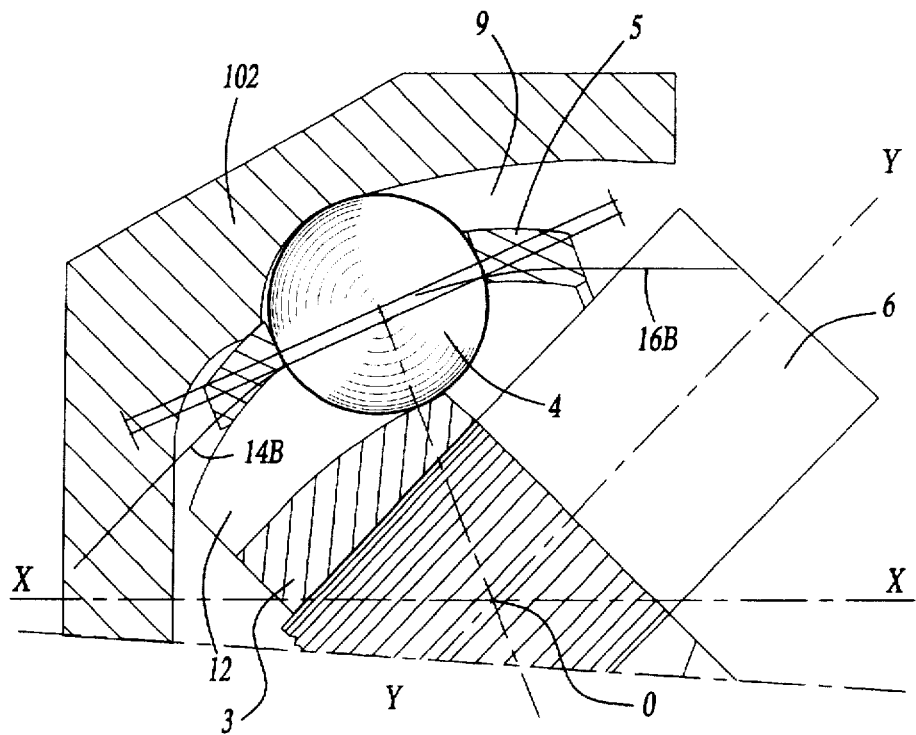
FIG. 6 is a half meridian sectional view, in the maximum flexing position of the joint parts, of the homokinetic joint of FIG. 3.
Figure 7:
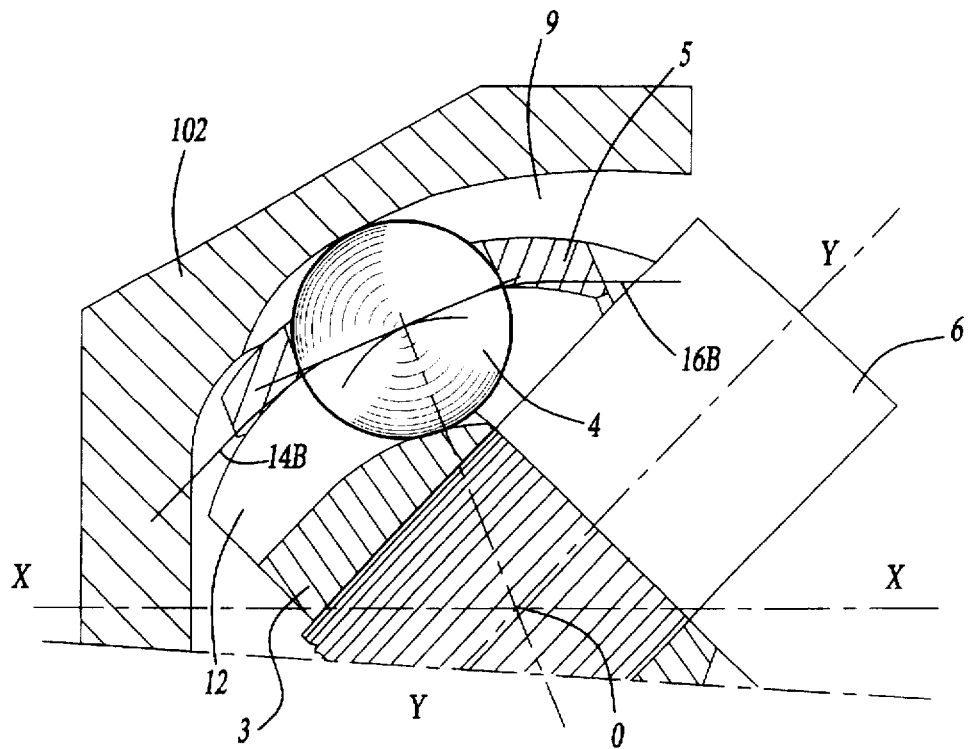
FIG. 7 is a similar half sectional view of the homokinetic joint on which the joint of FIG. 6 is based, in the same maximum flexing position.

FIG. 6 shows diagrammatically the joint 101 of FIG. 3A at its maximum flexing angle. It can be seen that, with respect to the UF joint from which it is derived and which is represented in the same way in FIG. 7:

the balls undergo reduced radial displacements and, with everything else being equal, no longer reach the edges defining the guiding openings 13 of the cage;

and the lines 16B and 14B become practically tangent to each other by passing within the flexing angle, in the flexing plane, which reduces the oversizing of the definition of the bisecting plane of the joint.

What is claimed is:

1. Fixed ball-type homokinetic joint comprising a combination:

a bell element (2) having an axis (X—X) of rotation for connection to a first shaft, said bell element having an entrance end and an inner end and defining a cavity which has an at least partly spherical surface (8) and six first grooves (9), each first groove having a directrix line (14A;14B) contained in an axial plane of said bell element;

a hub element having an axis (Y—Y) of rotation for connection to a second shaft (6), said hub element defining an at least partly spherical outer surface (11) and six second grooves (12), each second groove having a directrix line (16A;16B;16C;16D) contained in an axial plane of said hub element;

six balls (4) respectively and partly received in pairs of said first and second grooves;

a cage (5) cooperative with said balls for retaining said balls (4) in a bisecting plane (PB) of said joint when said joint is flexed, said cage comprising spherical outer and inner surfaces respectively substantially conjugate to said at least partly spherical surface (8) of said bell element and said at least partly spherical surface (11) of said hub element, said directrix lines of said first and second grooves being constantly symmetric relative to said bisecting plane and each comprising, for said first grooves (9), a first arc having a center of curvature (01) offset toward said entrance end of said bell element relative to the center (0) of said joint and, for said second grooves, a second arc having a center of curvature (02) which is offset toward said inner end of said bell element relative to said center (0) of said joint, wherein in considering for each second groove (12), (i) a predetermined first point (R;B) of said directrix line (16A;16B;16D;16G) in a position selected from the group consisting of a position in which said first point is spaced from a diametral plane (P) of said hub element perpendicular said axis of said hub element, toward said entrance end of said bell element and a position in which said first point is contained in said diametral plane, (ii) the tangent (T), at said first point, to the circle (C) centered on the corresponding center of curvature (02;03;0B) of said directrix line, and (iii) a reference point (V) positioned radially outside a point (L) of said circle which is positioned in said bisecting plane (PB) of the joint when the joint is flexed at a maximum angle, wherein:

the directrix line of said second groove (16A;16B;16C;16D) is a curve which is tangent to said tangent (T) at said first point (R;B) and passes through said reference point (V).

2. Homokinetic joint according to claim 1, wherein said curve (16A;16B;16D;16G) extends, within the limits of said hub element (3), on each side of a plane (P2;P3) parallel to said diametral plane (P) and containing a point (U) of the directrix, line the most remote from said axis (X—X) of said hub element.

3. Homokinetic joint according to claim 1, wherein said reference point (V) is so chosen as to define, at the adjacent end of said hub element (3), a groove depth substantially equal to the groove depth in said diametral plane (P) of said hub element.

4. Homokinetic joint according to claims 1, wherein said curve (16A;16B;16D) comprises an arc of a circle (16;16E) which extends on each side of said diametral plane (P) and is extended toward said entrance end of said bell element by a curve segment (T,TC1,TC2) positioned between said circle (C) and a line parallel to said axis (Y—Y) of said hub element which passes through the closest end (R) of said arc of a circle.

5. Homokinetic joint according to claim 4, wherein said arc of a circle (16;16E) extends from said diametral plane (P) in a portion (BR) subtending an angle at the center (02B,02R) which permits having constantly a minimum of four balls (4) in portions of said grooves corresponding to said arcs of a circle when said joint operates at its maximum flexing angle.

6. Homokinetic joint according to claim 5, wherein said portion of said arc of a circle subtends an angle at the center (02B,02R) of substantially 5°.

7. Homokinetic joint according to claim 4, wherein said curve segment is the tangent (T) to said arc of a circle (16;16E) at said first point (R).

8. Homokinetic joint according to claim 4, wherein said center (03) of said arc of a circle is positioned beyond said axis (Y—Y) of said hub element 3 relative to said first point (R).

9. Homokinetic joint according to claim 1, wherein said curve (16G) comprises an arc of a circle (16H) of a conic which is tangent at said first point (B) to said tangent (C), said arc passing through said reference point (V).

10. Homokinetic joint according to claim 9, wherein said conic has an axis of symmetry (P3) perpendicular to said axis (Y—Y) of said hub element (3).

11. Homokinetic joint according to claim 9, wherein said conic is a hyperbola.

12. Homokinetic joint according to claim 1, wherein said curve is extended toward said inner end of said bell element beyond a point (U) where the tangent to said curve (16A) is parallel to said axis (Y—Y) of said hub element (3), within the limits of said hub element, by an arc of a circle centered on the center of curvature corresponding to said point (U).

13. Homokinetic joint according to claim 1, wherein said curve is extended by said tangent toward said inner end of said bell element beyond a point (U) where the tangent to said curve (16B;16D;16G) is parallel to said axis (Y—Y) of said hub element (3), within the limits of said hub element.

* * * * *